(12) United States Patent
Nichols

(10) Patent No.: US 7,270,508 B2
(45) Date of Patent: Sep. 18, 2007

(54) APPARATUS AND METHOD FOR TRANSPORTING CHASSIS

(76) Inventor: Anthony L. Nichols, 5719 N. Wyoming, Kansas City, MO (US) 64118

( * ) Notice: Subject to any disclaimer, the term of this patent is extended or adjusted under 35 U.S.C. 154(b) by 168 days.

(21) Appl. No.: 11/070,537

(22) Filed: Mar. 2, 2005

(65) Prior Publication Data

US 2006/0171791 A1    Aug. 3, 2006

Related U.S. Application Data

(60) Provisional application No. 60/649,026, filed on Feb. 1, 2005.

(51) Int. Cl.
*B60P 3/06* (2006.01)
(52) U.S. Cl. ...................................... 410/56
(58) Field of Classification Search ................. 410/56, 410/57, 58, 52, 2, 3, 31, 43, 77
See application file for complete search history.

(56) References Cited

U.S. PATENT DOCUMENTS

| | | | | |
|---|---|---|---|---|
| 3,048,437 A | * | 8/1962 | Linder | 410/4 |
| 4,611,962 A | * | 9/1986 | Braly et al. | 410/57 |
| 4,650,381 A | * | 3/1987 | Durkin | 410/43 |
| 4,952,118 A | * | 8/1990 | Macmillan | 414/788.2 |
| 4,986,705 A | * | 1/1991 | Durkin | 410/57 |
| 5,934,695 A | * | 8/1999 | Rowland | 280/33.998 |
| 6,241,438 B1 | * | 6/2001 | Corbett et al. | 410/56 |
| 6,729,817 B1 | * | 5/2004 | Fennell | 410/56 |

* cited by examiner

*Primary Examiner*—H Gutman
(74) *Attorney, Agent, or Firm*—Hovey Williams LLP

(57) ABSTRACT

A method and apparatus for the hauling of chassis. The chassis hauler presents a front support system which supports multiple chassis. The chassis are stacked on top of one another in such a manner that their wheels face the same direction.

29 Claims, 10 Drawing Sheets

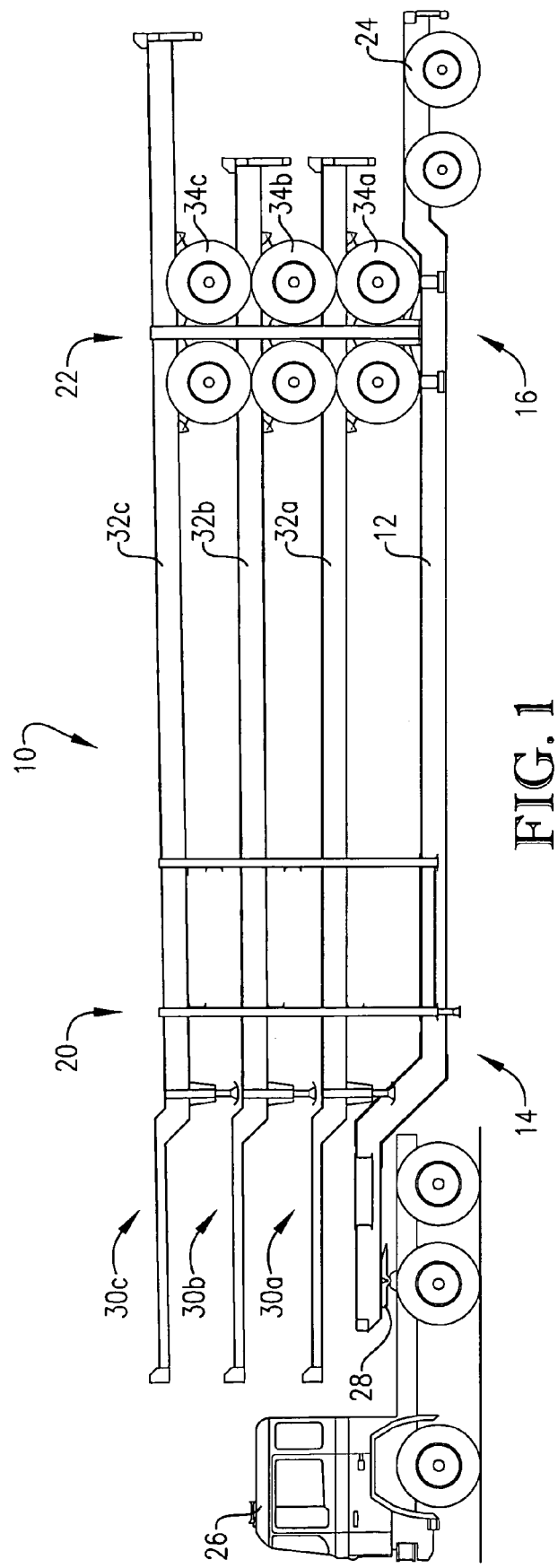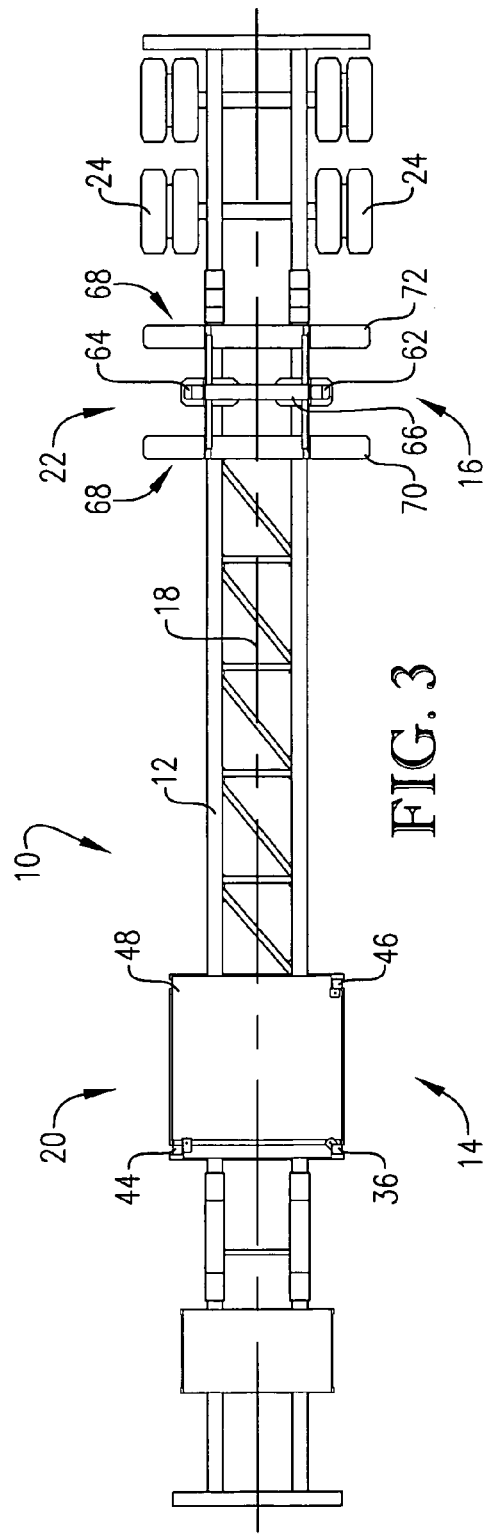
FIG. 1
FIG. 3

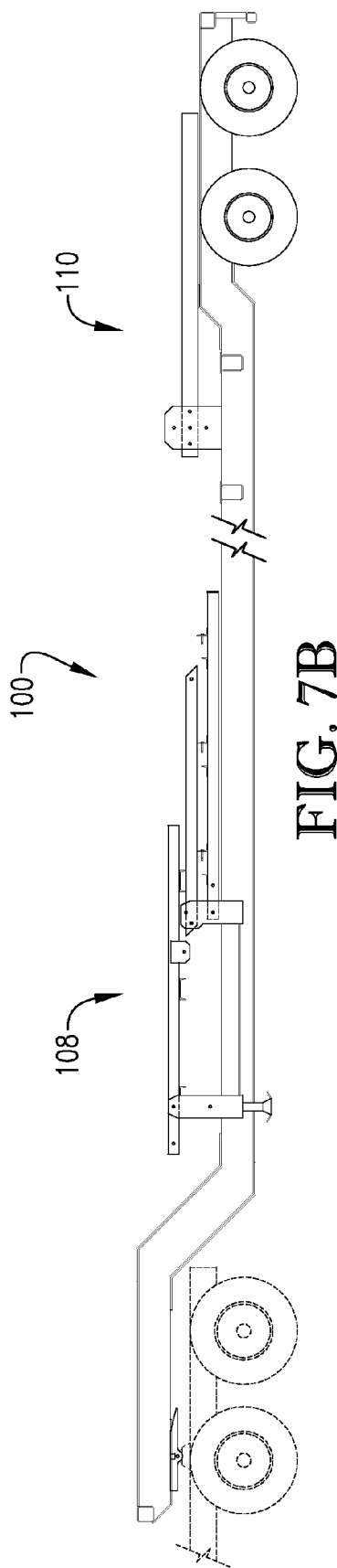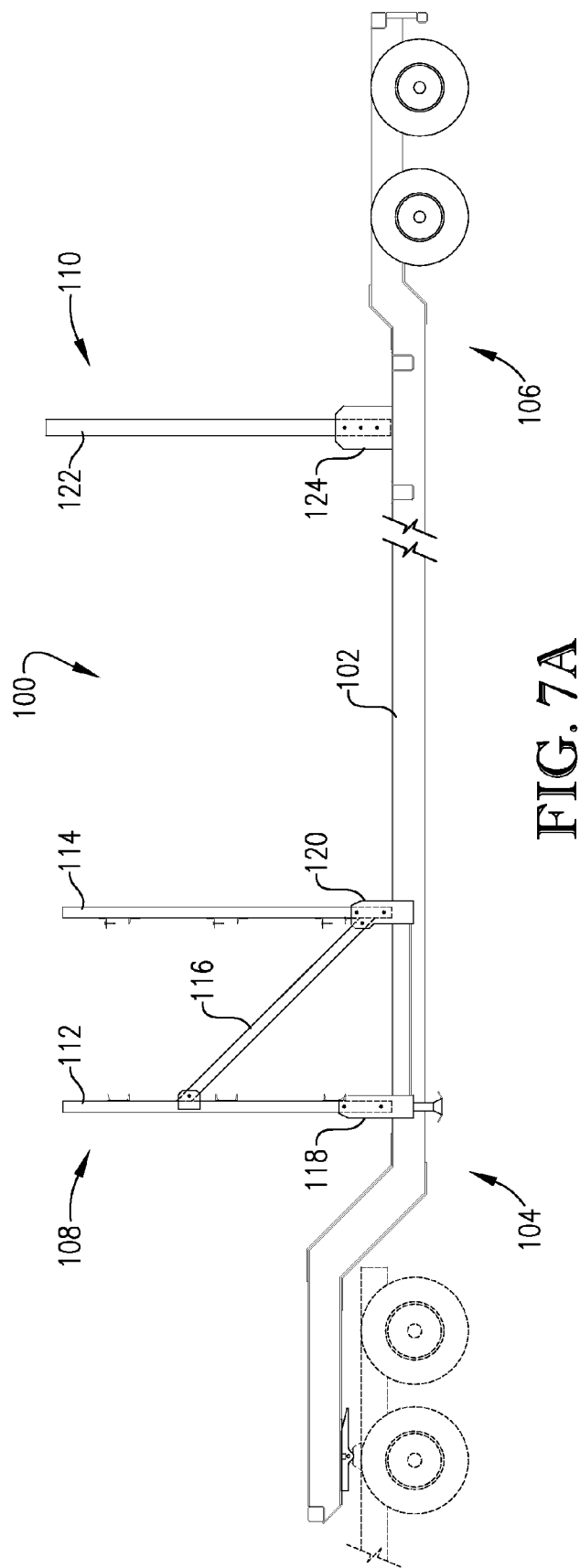
FIG. 7B
FIG. 7A

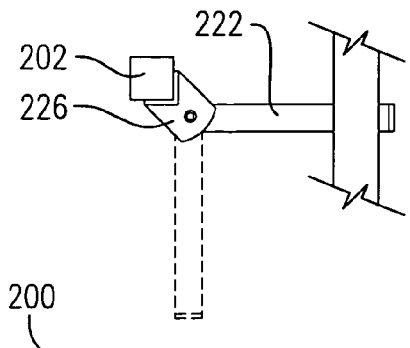
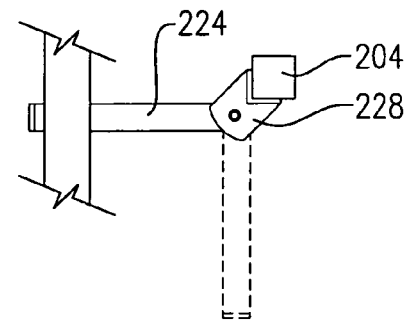
FIG. 9
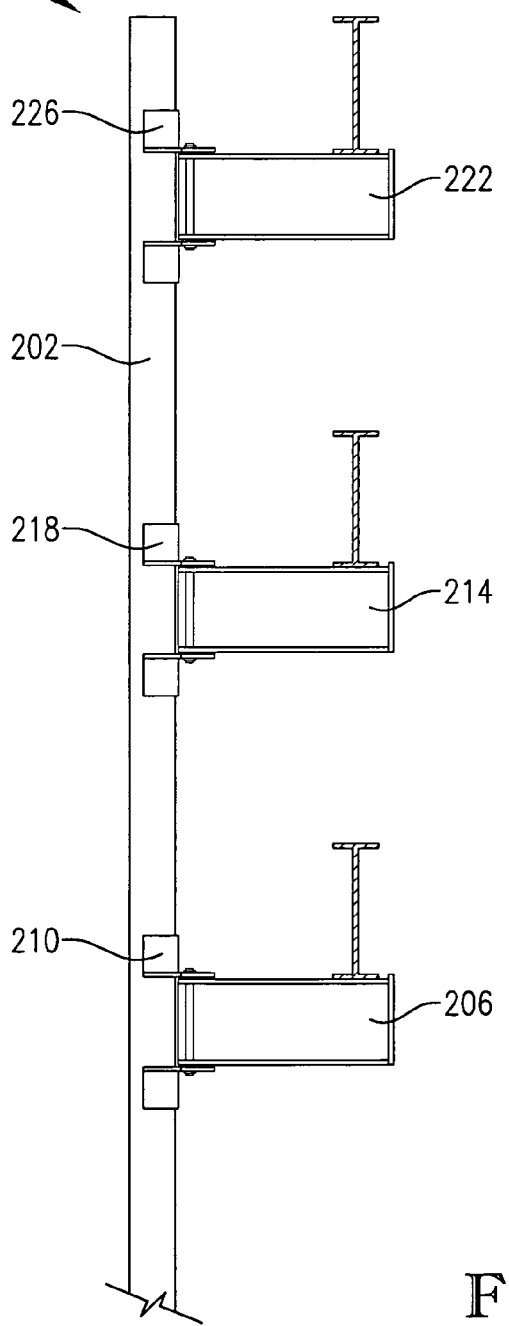
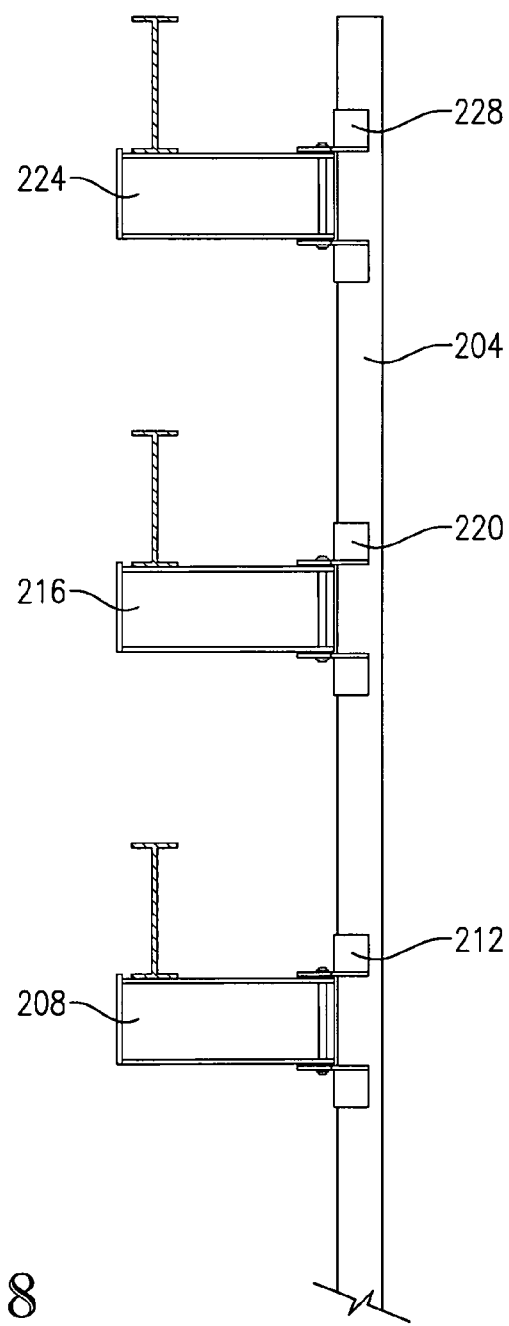
FIG. 8

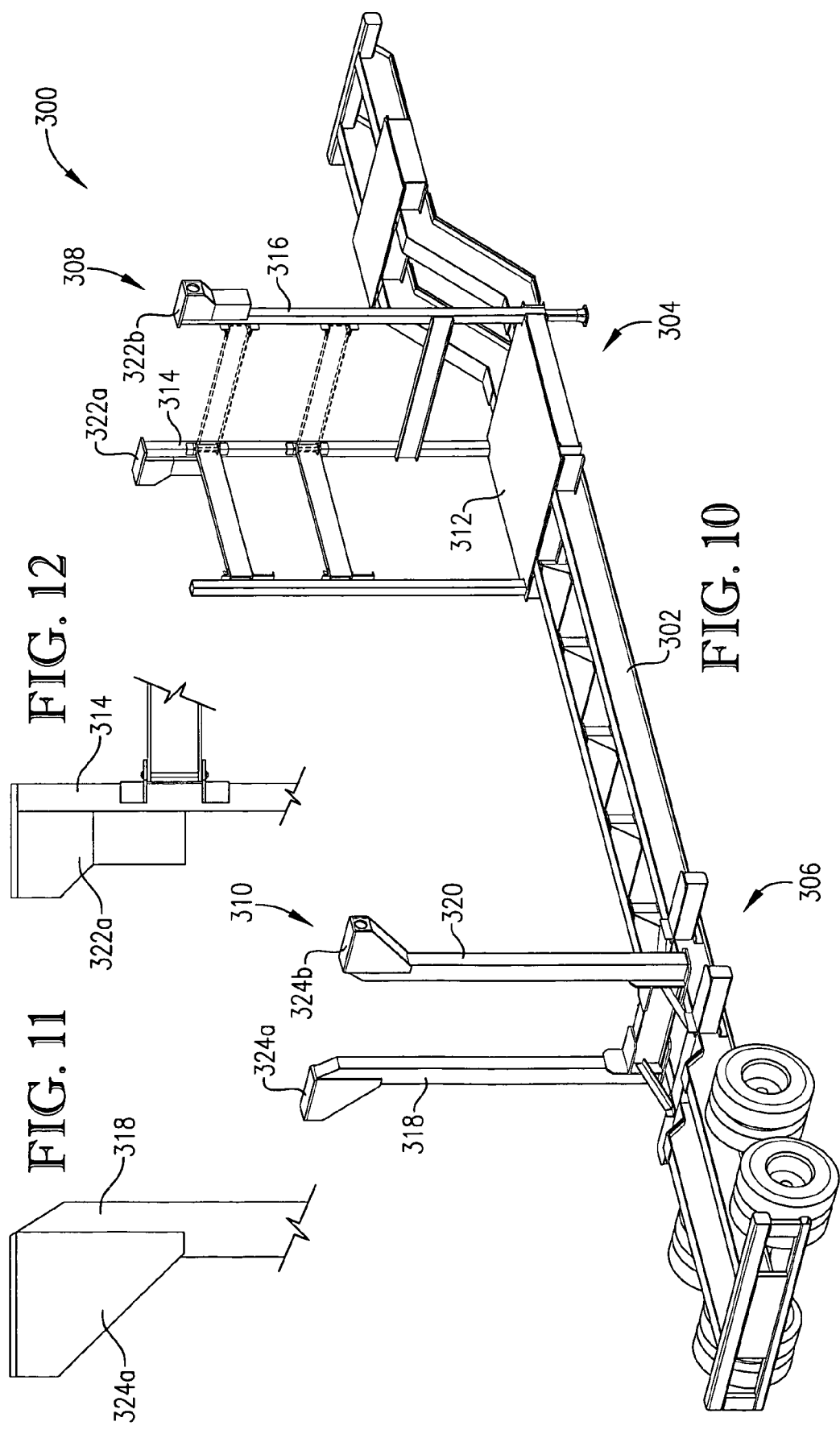

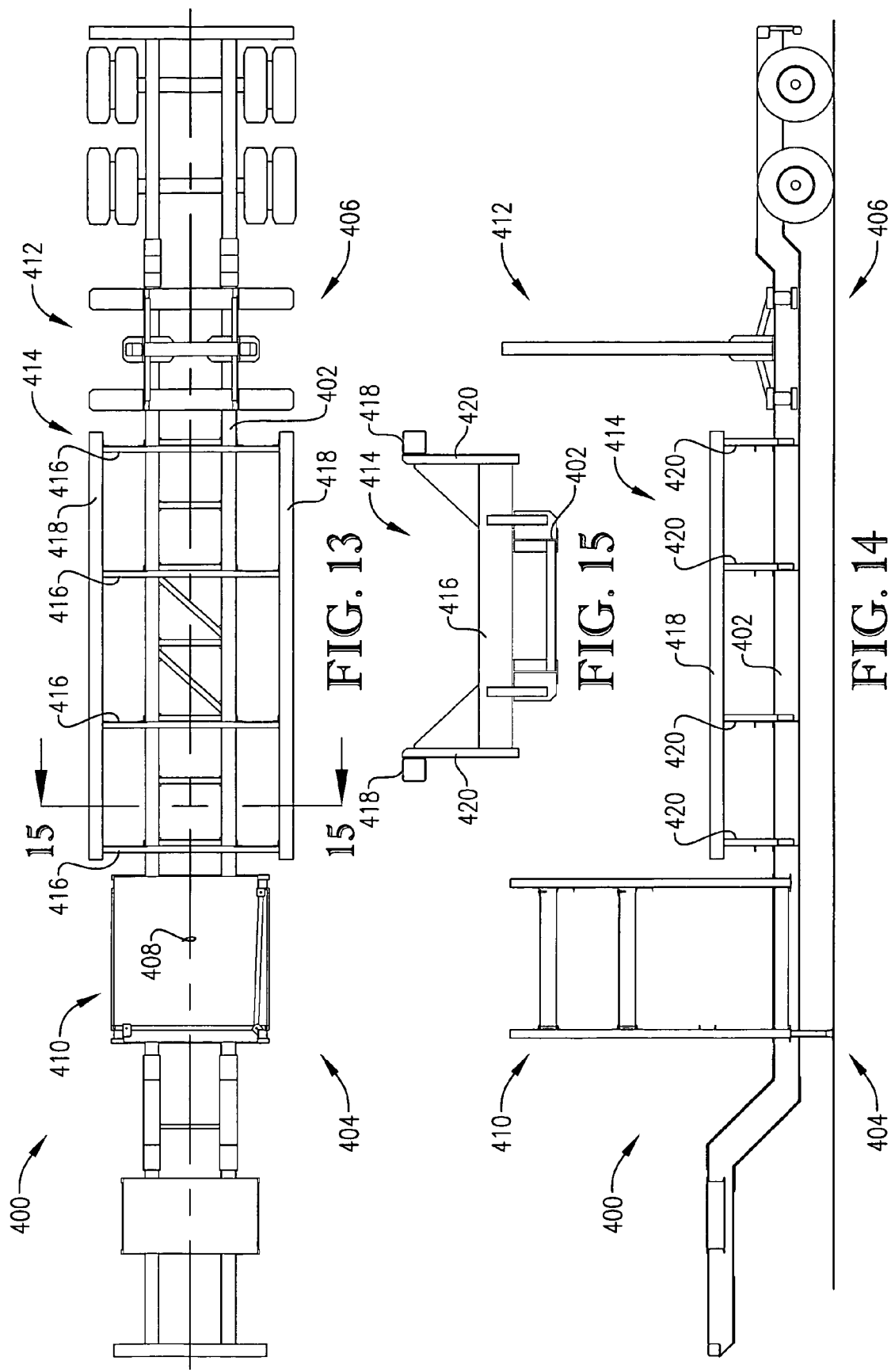

APPARATUS AND METHOD FOR TRANSPORTING CHASSIS

RELATED APPLICATIONS

This application claims the benefit of provisional application Ser. No. 60/649,026 filed on Feb. 1, 2005, the teachings and content of which are incorporated by reference herein.

BACKGROUND OF THE INVENTION

1. Field of the Invention

The present invention relates generally to an improved apparatus and method for transporting chassis. In one aspect, the invention concerns a chassis hauler with a front support system comprising upright and lateral supports. In another aspect, the invention concerns a system of transporting chassis involving a chassis hauler and at least two chassis. In another aspect, the invention concerns a method of transporting chassis involving stacking at least two chassis on a chassis hauler.

2. Discussion of the Prior Art

Chassis are traditionally employed to support box containers and are pulled by trucks in order to haul freight over the road. They are frequently transported on rail cars over long distances in order to provide a means of delivery for containers from the terminal to local locations. Within a given local area, however, there is sometimes a discrepancy between the number of needed chassis between two or more terminals. In cases such as this, it is often more feasible to transport the chassis over the road than to use the rail system. However, transporting chassis over the road is an inefficient process. Typically, only one chassis is hauled by truck at a time. Loading the chassis onto a trailer involves several people, as well as the use of a crane. If more than one chassis is loaded at a time, loading the chassis necessitates that one chassis be flipped upside down using a mechanical chassis flipper. This necessitates more people, more equipment, and more time. Also, there is more risk in this process, as there are increased dangers involved in flipping and loading additional chassis. Additionally, the process of flipping the chassis at both the starting terminal and ending terminal frequently results in damage to the chassis, which may necessitate repair.

OBJECTS AND SUMMARY OF THE INVENTION

Responsive to these and other problems, an object of the present invention is to provide an apparatus that enables more efficient loading and transporting of chassis.

A further object of the present invention is to provide a system for the safe and effective transportation of chassis.

Another object of the present invention is to provide for a safe, efficient, and cost-effective method of loading chassis for transportation.

It should be noted that not all of the above-listed objects need be accomplished by the invention claimed herein and other objects and advantages of this invention will be apparent from the following description of the invention and the appended claims.

In accordance with one embodiment of the present invention, there is provided a hauler for the transportation of chassis. The hauler comprises a main body, which has a length measured in a longitudinal direction and a width measured in a transverse direction. The main body also defines a longitudinally-extending centerline and presents longitudinally-spaced front and rear portions. The hauler also comprises a plurality of wheels rotatably coupled to the main body proximate the rear portion and a front support system coupled to the main body proximate the front portion. The front support system comprises a first upright support member extending upwardly from the main body and a first lateral support member shiftably coupled to the first upright support member. The first lateral support member is shiftable between an extended position, where the first lateral support member extends over the centerline, and a retracted position, where the first lateral support member does not extend over the centerline.

In accordance with another embodiment of the present invention, there is provided a hauler for the transportation of chassis. The hauler comprises a main body, which has a length measured in a longitudinal direction and a width measured in a transverse direction. The main body also defines a longitudinally-extending centerline and presents longitudinally-spaced front and rear portions. The hauler also comprises a plurality of wheels rotatably coupled to the main body proximate the rear portion and a front support system coupled to the main body proximate the front portion. The front support system comprises first and second upright support members extending upwardly from the main body and disposed on opposite sides of the centerline. The front support system also comprises first and second lateral support members shiftably coupled to the first and second upright support members, respectively. The first and second lateral support members are shiftable between extended and retracted positions, and the first and second lateral support members extend at least 6 inches further towards the centerline when in the extended position than when in the retracted position.

In accordance with another embodiment of the present invention, there is provided a system for the transportation of chassis including a chassis hauler, a first chassis, and a second chassis. The chassis hauler includes a front support system which comprises at least one upright support member. The front support system also includes at least two lateral support members, which are adjustably coupled to the upright support member. The lateral support members are adjustable between an extended and retracted position. The first chassis is supported by a first lateral support member in the extended position. The second chassis is supported by a second lateral support member in the extended position. Both the first and second chassis are positioned so that their rear wheels face downward.

In accordance with another embodiment of the present invention, there is provided a method of transporting a chassis that includes the steps of loading a first chassis onto a chassis hauler such that it is at least partially supported by a first lateral support member. Following the loading of the first chassis, a second lateral support member is shifted such that it is in an extended position; and a second chassis is loaded onto the chassis hauler such that the second chassis is placed over the first chassis and is at least partially supported by the second lateral support member. Both of the chassis are positioned such that their rear wheels face downward.

BRIEF DESCRIPTION OF THE DRAWING FIGURES

Preferred embodiments of the invention are described in detail below with reference to the attached drawing figures, wherein:

FIG. 1 is a schematic drawing of a side view of a chassis hauler according to one embodiment of the present invention that illustrates the chassis hauler loaded with three chassis;

FIG. 3 is a top view of a chassis hauler of FIG. 1 that is not loaded with any chassis;

FIG. 7A is a partial side view of a chassis hauler according to one embodiment of the present invention illustrating the front and rear support systems in an upright position;

FIG. 7B is a partial side view of the chassis hauler of FIG. 7A where the front and rear support systems are in a collapsed position;

FIG. 8 is a schematic partial front view of a chassis hauler according to one embodiment of the present invention particularly illustrating a front support system that includes six lateral supports that is loaded with three chassis;

FIG. 9 is a schematic partial top view of the chassis hauler of FIG. 8 illustrating two lateral supports moving from their retracted to extended positions;

FIG. 10 is an isometric view of the chassis hauler according to one embodiment of the present invention that includes tree picks for loading the chassis hauler onto a rail car;

FIG. 11 is a front view of a tree pick coupled to a rear support member of the chassis hauler of FIG. 10;

FIG. 12 is a front view of a tree pick coupled to a front upright support member of the chassis hauler of FIG. 10;

FIG. 13 is a top view of the chassis hauler according to one embodiment of the present invention illustrating a pick-up bracket attached to the hauler;

FIG. 14 is a side view of the chassis hauler of FIG. 13;

FIG. 15 is a front view of the chassis hauler taken along line 15-15 of FIG. 13.

DETAILED DESCRIPTION OF THE PREFERRED EMBODIMENTS

Figure 2A:
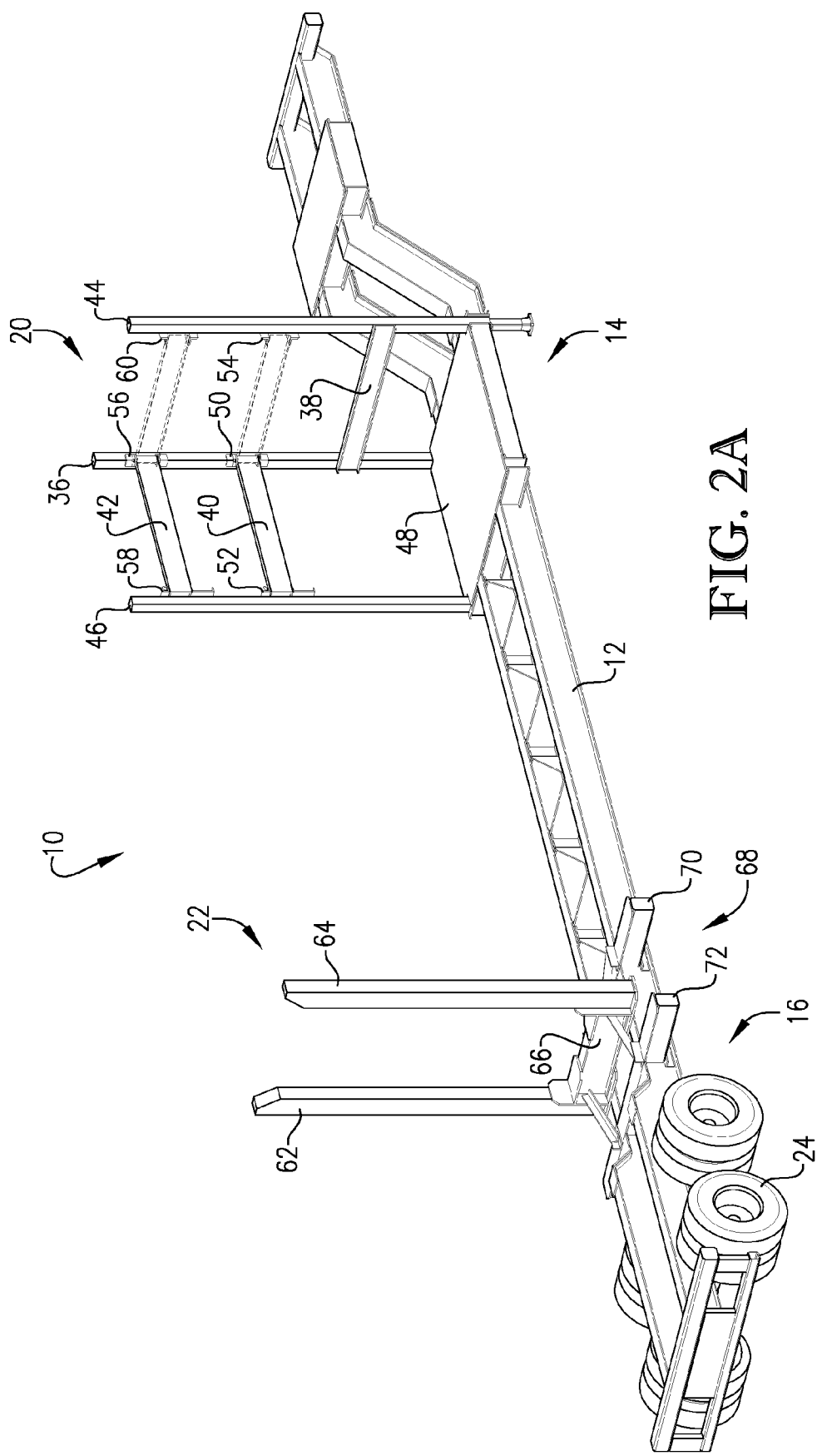
FIG. 2A is an isometric view of the chassis hauler of FIG. 1 wherein the chassis hauler is not loaded.

Turning initially to FIGS. 1 and 3, one embodiment of the present invention comprises chassis hauler 10. This embodiment consists of a main body 12, which presents a front portion 14 and a rear portion 16. Main body 12 preferably has a length, measured longitudinally, between about 40 feet and about 60 feet, more preferably between about 45 feet and about 55 feet, and most preferably about 53 feet. Main body 12 preferably has a width, measured in a transverse direction, between about 2 feet and about 14 feet, more preferably has a width between about 3 feet and about 8 feet, and most preferably has a width of about 3½ feet. Main body 12 also defines a centerline 18 which bisects main body 12 in a longitudinal direction. Hauler 10 preferably includes a front support system 20 which is coupled to front portion 14 of main body 12. In one embodiment of the present invention, hauler 10 also includes a rear support system 22, which is coupled to rear portion 16 of main body 12. In one embodiment of the present invention, wheels 24 are coupled to rear portion 16 of main body 12. In one embodiment of the present invention, wheels 24 are conventional tires. In another embodiment of the present invention, wheels 24 are suitable for rail travel. When hauler 10 is being used for hauling on roads, hauler 10 may be coupled to a truck 26 by a connecting mechanism 28. Connecting mechanism 28 is coupled to front portion 14 of main body 12.

In the operation of one embodiment of the invention, a first, second, and third chassis 30a,b,c are stacked on top of one another on top of hauler 10. First chassis 30a generally comprises a first frame 32a and a first set of rear wheels 34a. Second chassis 30b generally comprises a second frame 32b and a second set of rear wheels 34b. Third chassis 30c generally comprises a third frame 32c and a third set of rear wheels 34c. Frames 32a,b,c include 2 I-beams, which extend longitudinally in the range of from about 15 feet to about 60 feet, more preferably from about 30 feet to about 55 feet. First, second, and third chassis 30a,b,c are each loaded onto hauler 10 in such a manner that first, second, and third sets of rear wheels 34a,b,c all face downward. In one embodiment of the present invention, when the first, second, and third chassis 30a,b,c are loaded, second set of rear wheels 34b rests on top of first set of rear wheels 34a, and third set of rear wheels 34c rest on top of second set of rear wheels 34b. Front support system 20 and rear support system 22 provide support for chassis 30a,b,c while they are being hauled by hauler 10.

Turning now to FIGS. 2A, 3, 5A, and 5B, in one embodiment of the present invention front support system 20 comprises a first upright support member 36 which is coupled to and extends upwardly from main body 12. First upright support member 36 extends in the range of from about 6 feet to about 14 feet, preferably from about 8 to about 12 feet, and most preferably about 11 feet high. Front support system 20 also includes lower lateral support member 38, which is coupled to and extends from first upright support 36 such that lower lateral support member 38 extends at least about 1 foot above main body 12, more preferably at least about 1 foot, 6 inches about main body 12, and most preferably at least about 2 feet above main body 12. In one embodiment of the present invention, lower lateral support member 38 is shiftably coupled to first upright support member 36. In another embodiment of the present invention, front support system 20 also includes middle lateral support member 40 and upper lateral support member 42. Both middle and upper lateral support members 40 and 42 are shiftably coupled to and extend from upright support member 36. Middle lateral support member 40 extends from upright support member 36 at least about 1 foot above lower lateral support member 38, more preferably at least about 1 foot, 6 inches above lower lateral support member 38, and most preferably at least about 2 feet above lower lateral support member 38. Upper lateral support member 42 extends from upright support member 36 at least about one foot above middle lateral support member 40, preferably at least about 1 foot, 6 inches above middle lateral support member 40, and most preferably at least about 2 feet above middle lateral support member 40. Lower, middle, and upper lateral support members 38, 40, 42 extend between about 2 and about 14 feet, more preferably between about 4 and about 8 feet, and most preferably about 6 feet.

In one embodiment of the present invention, lower, middle, and upper lateral support members 38,40,42 are shiftable from an extended position to a retracted position. Lower, middle, and upper lateral supports 38,40,42 each present an upwardly-facing support surface. In the extended position, lower, middle, and upper lateral support members 38,40,42 extend over centerline 18. In the retracted position, lower, middle, and upper lateral support members 38,40,42 do not extend over centerline 18. In another embodiment of the present invention, lower, middle, and upper lateral support members 38,40,42 extend at least about 2 feet further, preferably at least about 3 feet further, and most preferably at least about 4 feet further over the main body in the extended position than they do in the retracted position. In another embodiment of the present invention, front support system 20 includes a second upright support member 44, which is disposed on the opposite side of the centerline 18 from first upright support member 36 and is spaced transversely at least about 2 feet away from first upright support member 36. In another embodiment of the present invention, front support system 20 also includes a third upright support member 46, which is disposed on the same side of the centerline 18 from first upright support member 36 and is spaced longitudinally at least about 2 feet away from upright support member 36. In one embodiment of the present invention, middle lateral support member 40 swings on hinge 50, preferably substantially horizontally, from the extended to retracted position. In the retracted position, middle lateral support member 40 is coupled to third upright support member 46 by locking mechanism 52. In the extended position, middle lateral support member 40 is coupled to second upright support member 44 by locking mechanism 54. Upper lateral support member 42 swings on hinge 56, preferably substantially horizontally, from the extended to retracted position. In the retracted position, upper lateral support member 42 is coupled to third upright support member 46 by locking mechanism 58. In the extended position, upper lateral support member 40 is coupled to second upright support member 44 by locking mechanism 60. In one embodiment of the present invention, lower lateral support member 38 is immovably coupled to first upright support member 36 and second upright support member 44. In another embodiment of the present invention not shown, lower lateral support member 38 is shiftably coupled to first upright support 36 in the same manner as described for middle and upper lateral support 40,42 above.

In one embodiment of the present invention, the front support system also includes a support platform 48. Support platform 48 is coupled to main body 12. Support platform is preferably between about 3 feet to about 12 feet wide measured transverse to centerline 18, more preferably between about 4 feet and 10 feet wide, and is most preferably about 6 feet wide. Support platform 48 is preferably rectangular in shape. In another embodiment of the present invention, first, second, and third upright support members 36, 44, and 46 extend upwardly from corners of support platform 48.

Turning to FIGS. 2A and 3, in one embodiment of the present invention, rear support system 22 includes a first rear upright support member 62 and a second rear upright support member 64 which are coupled to and extend upwardly from main body 12. First and second rear upright support members 62 and 64 extend in the range of from about 6 feet to about 14 feet, preferably from about 8 to about 12 feet, and most preferably about 11 feet high. First and second rear upright support members 62 and 64 are disposed on opposite side of centerline 18 and are spaced transversely at least about 2 feet apart. In another embodiment of the present invention, rear support system 22 includes support beam 66. Support beam 66 is coupled to and extends laterally from main body 12 in a transverse direction to centerline 18. Support beam 66 is preferably between about 2 feet to about 12 feet wide measured transverse to centerline 18, more preferably between about 3 feet and about 8 feet wide, and is most preferably about four feet wide. First and second rear upright support members 62 and 64 are coupled to and extend upwardly from support beam 66. In one embodiment of the present invention, rear support system 22 also includes a tire support 68. Tire support 68 is preferably coupled to main body 12 and preferably extends laterally in a direction transverse to centerline 18. In another embodiment of the present invention, tire support 68 comprises first tire support member 70 and second tire support member 72. First and second tire support members 70,72 are coupled to and extend laterally from main body 12 in a direction transverse to centerline 18. First and second tire support members are between about 2 feet and 14 feet long measured transverse to centerline 18, more preferably between about 4 feet and 10 feet long, and are most preferably about 8 feet long. First and second tire support members 70,72 are disposed on opposite sides of support beam 66. First and second tire support members 70, 72 are longitudinally spaced between about 1 foot and 6 feet away from each other, preferably between about 2 feet and about 5 feet away from each other, and are most preferably spaced about 4 feet away from each other.

Figure 2B:
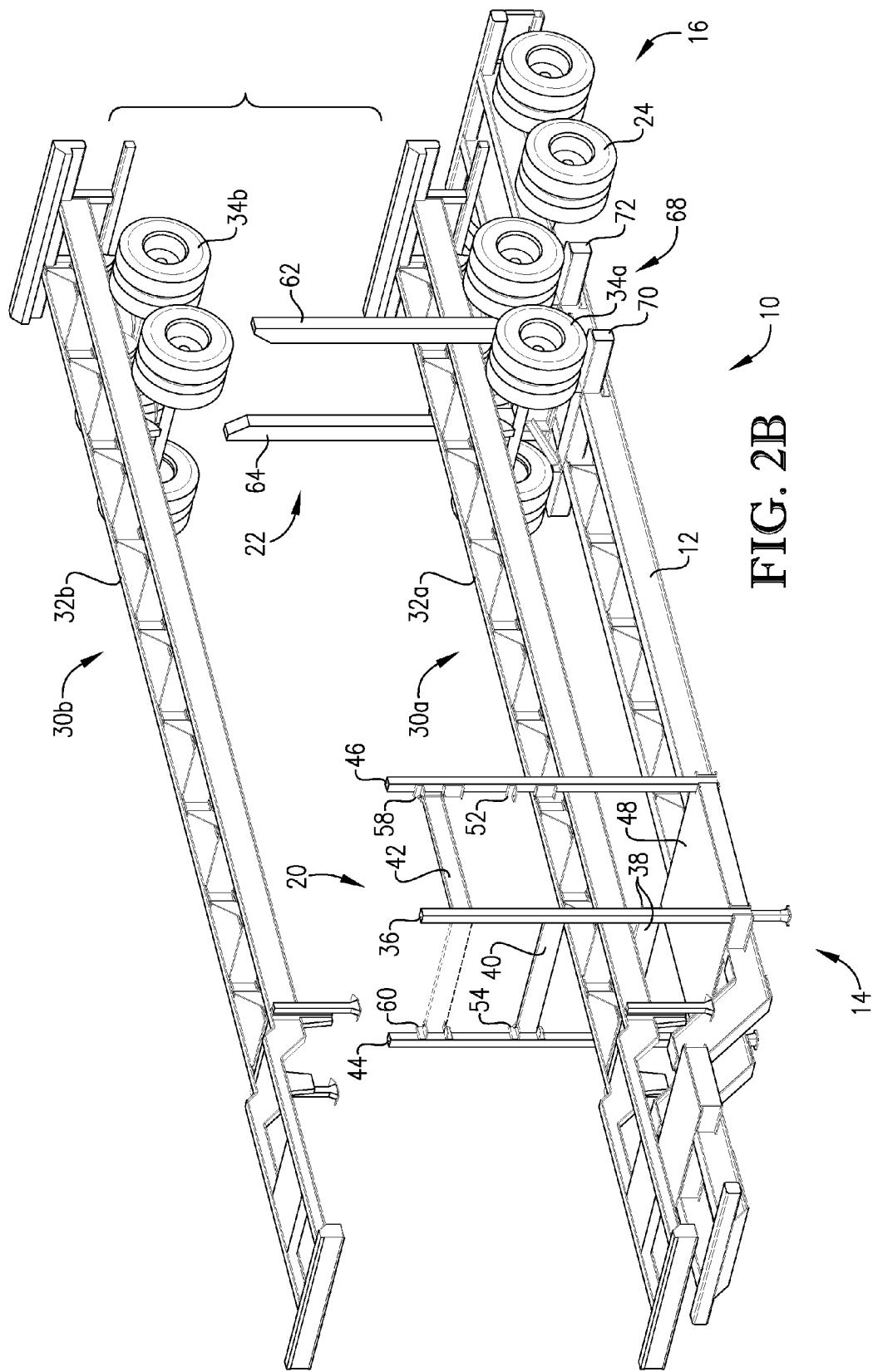
FIG. 2B is an isometric view of the chassis hauler of FIG. 1 loaded with one chassis and illustrating a second chassis being loaded.
Figure 4:
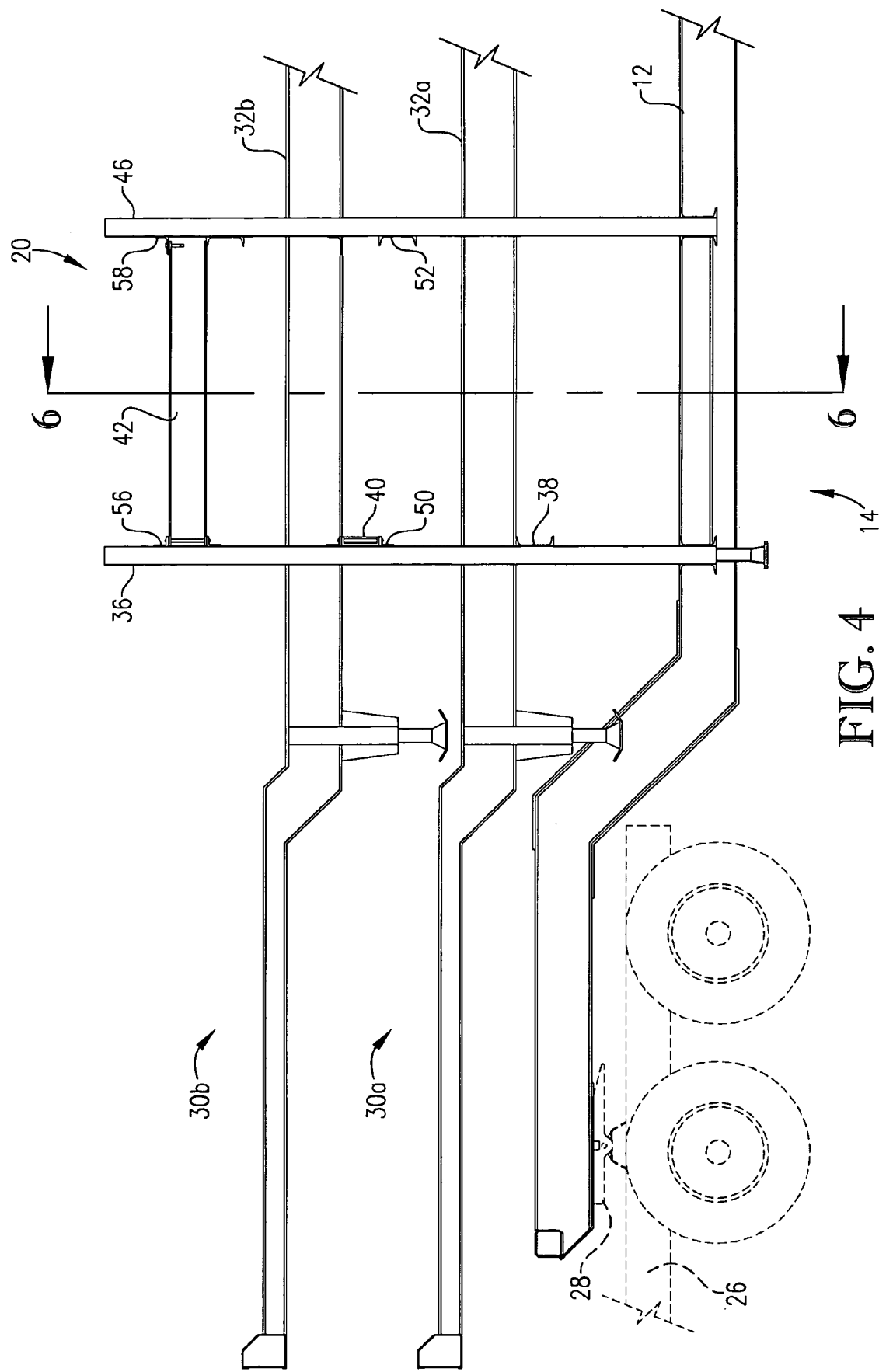
FIG. 4 is a partial side view of the chassis hauler of FIG. 1 particularly illustrating the front support system loaded with two chassis.
Figure 5:
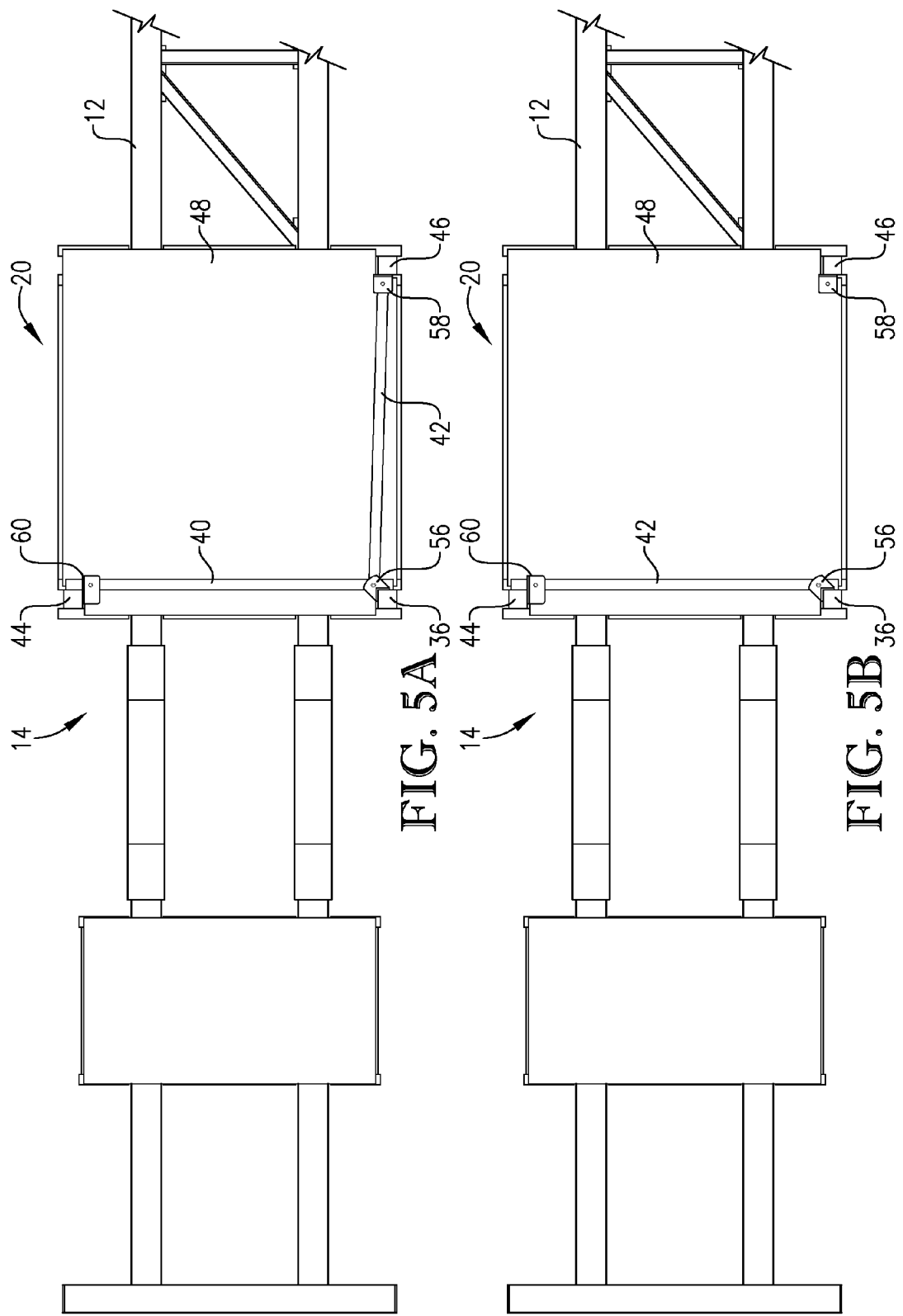
FIG. 5A is a partial top view of the chassis hauler of FIG. 1 illustrating one of the lateral support members of the front support system in a retracted position.
FIG. 5B is a partial top view of the chassis hauler of FIG. 1 illustrating one of the lateral support members of the front support system in an extended position.
Figure 6:
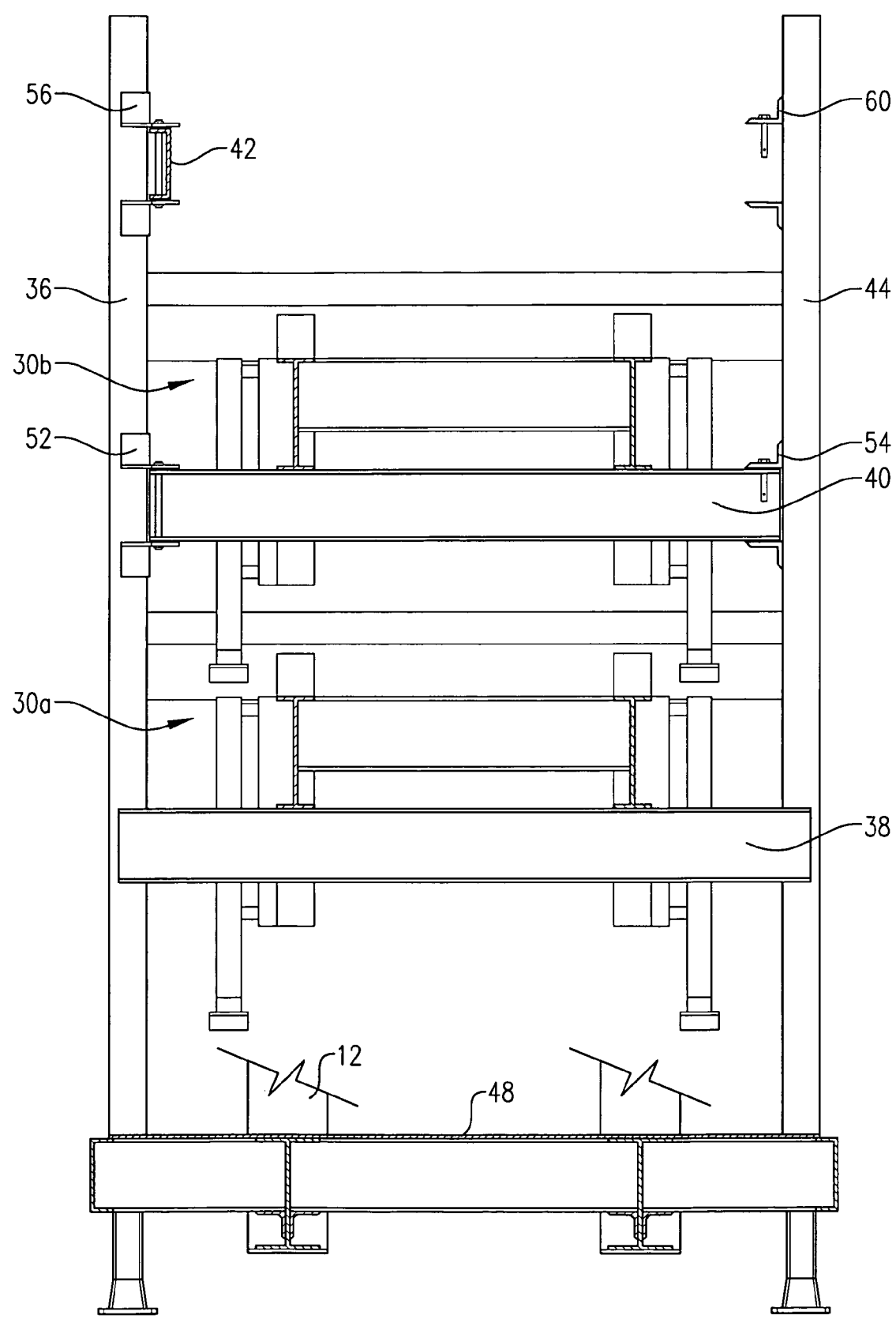
FIG. 6 is a sectional view of the chassis hauler taken along line 6-6 of FIG. 4 that has been loaded with two chassis and shows a lateral support member in a retracted position.

Turning now to FIGS. 2B, 4, and 6, in one embodiment of the present invention a method for loading chassis onto a chassis hauler is defined. In one embodiment of the present invention, where lower lateral support 38 is immovably coupled to first upright support 36, first chassis 30a is loaded onto chassis hauler 10. First chassis 30a is lifted to a height greater than that of first, second, and third uprights supports 36,44,36 and first and second rear upright support members 62,64. First chassis 30a is then lowered onto the hauler such that frame 32a is between first and second upright support members 36,44 and first and second rear upright support members 62,64 and is at least partially supported by the upwardly facing support surface of lower lateral support 38. In one embodiment of the present invention, where lower lateral support 38 is shiftably coupled to first upright support 36, lower lateral support 38 is first shifted into the extended position and coupled to second upright support 44. Then, first chassis 30a is loaded onto chassis hauler 10 in the manner previously described. After first chassis 30a is loaded onto hauler 10, middle lateral support 40 is shifted into the extended position and coupled to second upright support 44. Then, second chassis 30b is lifted to a height greater than that of first, second, and third upright support members 36,44,46 and first and second rear upright support members 62,64. Second chassis 30b is then lowered onto the hauler such that frame 32b is between first and second upright support members 36,44 and first and second rear upright support members 62,64 and is at least partially supported by the upwardly facing support surface of middle lateral support 38. In another embodiment of the present invention, second chassis wheels 34b rest on top of first chassis wheels 34a. In another embodiment of the present invention, after second chassis 30b is loaded onto hauler 10, upper lateral support 42 is shifted to the extended position and coupled to second upright support 44. Then, third chassis 30c is lifted to a height greater than that of first, second, and third upright supports 36,44,46 and first and second rear upright support members 62,64. Third chassis 30c is then lowered onto the hauler such that frame 32c is between first and second upright support members 36,44 and first and second rear upright support members 62,64 and is at least partially supported by the upwardly facing support surface of upper lateral support 42. In another embodiment of the present invention, third chassis wheels 34c rest on top of second chassis wheels 34b.

Turning now to FIGS. 7A and 7B, in one embodiment of the present invention, hauler 100 includes a main body 102, which presents a front portion 104 and a rear portion 106. Hauler 100 includes a front support system 108 which is shiftably coupled to front portion 104 of main body 102. Hauler 100 also includes a rear support system 110, which is shiftably coupled to rear portion 106 of main body 102. In one embodiment of the present invention, front support system 108 includes a first upright support 112. In another embodiment of the present invention, front support system 108 also includes a second upright support 114. In another embodiment of the present invention, front support system 108 also includes a third upright support. In another embodiment of the present invention, front support system 108 also includes a support bar 116 which is shiftably coupled to first upright support 112 and main body 102. In one embodiment of the present invention, first upright support 112 is shiftably coupled to the main body 102 by first support mechanism 118. Second upright support 114 is shiftably coupled to the main body 102 by second support mechanism 120. Support bar 116 is shiftably coupled to the main body by second support mechanism 120. Rear support system 100 includes at least one rear upright support 122. Rear upright support 122 is shiftably coupled to main body 102. In one embodiment of the present invention, rear upright support 122 is shiftably coupled to main body 102 by rear support mechanism 124. In one embodiment of the present invention, front support system 108 and rear support system 110 are shiftable from an upright position to a collapsed position. In the upright position, first upright support 112, second upright support 114, and rear upright support 122 extend at an angle greater than about 60 degrees from horizontal, more preferably greater than about 75 degrees from horizontal, still more preferably greater than about 85 degrees from horizontal, and most preferably at about 90 degrees from horizontal. In the collapsed position, first upright support 112, second upright support 114, and rear upright support 122 extend at an angle less than about 30 degrees from horizontal, preferably less than about 20 degrees from horizontal, more preferably less than about 10 degrees from horizontal, and most preferably at about 0 degrees from horizontal. In one embodiment of the present invention, when front support system is in the collapsed position, support bar 116 is decoupled from first upright support 112 and extends at an angle less than about 30 degrees from horizontal, preferably less than about 20 degrees from horizontal, more preferably less than about 10 degrees from horizontal, and most preferably at about 0 degrees from horizontal.

Turning to FIGS. 8 and 9, in another embodiment of the present invention, the front support system 200 of a chassis hauler as defined in FIGS. 1-6 includes a first upright support member 202 and a second upright support member 204. First and second upright support members 202,204 extend upwardly from the main body of the chassis hauler on opposite sides of the defined centerline of the main body of the chassis hauler. In one embodiment of the present invention, a first lateral support member 206 is immovably coupled to first upright support member 202, and a second lateral support member 208 is immovably coupled to upright support member 208. In another embodiment of the present invention, first lateral support member 206 is shiftably coupled to first upright support member 202, and second lateral support member 208 is shiftably coupled to second upright support member 204. First lateral support member 206 and second lateral support member 208 are about equally spaced from the main body of the chassis hauler. Preferably, first lateral support member 206 and second lateral support member 208 are spaced at least about 1 foot from the main body of the chassis hauler, more preferably at least about 1 foot, 6 inches from the main body of the chassis hauler, and are most preferably spaced at least 2 feet from the main body of the chassis hauler. In one embodiment of the present invention, first and second lateral support members 206,208 are shiftable between extended and retracted positions. In the extended position, first and second lateral support members 206,208 extend at least 6 inches further towards the center line of the main body of the chassis hauler than they do in the retracted position. In another embodiment of the present invention, first lateral support member 206 is coupled to first upright support member 202 by hinge 210, and second lateral support member 208 is coupled to second upright support member 204 by hinge 212. Hinges 210,212 enable first and second lateral support members 206,208, respectively, to swing, preferably substantially horizontally, between the extended and retracted positions. In another embodiment of the present invention, front support system 200 also includes third lateral support member 214 and fourth lateral support member 216. Third lateral support member 214 is shiftably coupled to first upright support member 202, and fourth lateral support member 216 is shiftably coupled to second upright support member 204. Third lateral support member 214 and fourth lateral support member 216 are about equally spaced from first and second lateral support members 206,208. Preferably, third lateral support member 214 and fourth lateral support member 216 are spaced at least about 1 foot from first and second lateral support members 206,208, more preferably at least about 1 foot, 6 inches from first and second lateral support members 206,208, and are most preferably spaced at least 2 feet from first and second lateral support members 206,208. In one embodiment of the present invention, third and fourth lateral support members 214,216 are shiftable between extended and retracted positions. In the extended position, third and fourth lateral support members 214,216 extend at least 6 inches further towards the center line of the main body of the chassis hauler than they do in the retracted position. In another embodiment of the present invention, third lateral support member 214 is coupled to first upright support member 202 by hinge 218, and fourth lateral support member 216 is coupled to second upright support member 204 by hinge 220. Hinges 218,220 enable third and fourth lateral support members 214,216, respectively, to swing, preferably substantially horizontally, between the extended and retracted positions. In another embodiment of the present invention, front support system 200 also includes fifth lateral support member 222 and sixth lateral support member 224. Fifth lateral support member 222 is shiftably coupled to first upright support member 202, and sixth lateral support member 224 is shiftably coupled to second upright support member 204. Fifth lateral support member 222 and sixth lateral support member 224 are about equally spaced from third and fourth lateral support members 214,216. Preferably, fifth lateral support member 222 and sixth lateral support member 224 are spaced at least about 1 foot from third and fourth lateral support members 214,216, more preferably at least about 1 foot, 6 inches from third and fourth lateral support members 214,216, and are most preferably spaced at least 2 feet from third and fourth lateral support members 214,216. In one embodiment of the present invention, fifth and sixth lateral support members 222,224 are shiftable between extended and retracted positions. In the extended position, fifth and sixth lateral support members 222,224 extend at least 6 inches further towards the center line of the main body of the chassis hauler than they do in the retracted position. In another embodiment of the present invention, fifth lateral support member 222 is coupled to first upright support member 202 by hinge 226, and sixth lateral support member 224 is coupled to second upright support member 204 by hinge 228. Hinges 226,228 enable fifth and sixth lateral support members 222,224, respectively, to swing, preferably substantially horizontally, between the extended and retracted positions.

Turning now to FIGS. 10, 11, and 12, in one embodiment of the present invention, hauler 300 includes a main body 302 which presents a front portion 304 and a rear portion 306. Hauler 300 includes a front support system 308 and a rear support system 310. Main body 302 also defines a centerline (not shown) which bisects main body 302 in a longitudinal direction. In one embodiment of the present invention, front support system 308 includes a support platform 312 which is coupled to main body 302. Front support system 308 also includes a first upright support member 314 and a second upright support member 316. First and second upright support members 314,316 are coupled to corners of support platform 312 on the same side of support platform 312, but on opposite sides of the centerline of main body 302. Rear support system 310 includes a first rear support member 318 and a second rear support member 320, which are disposed on opposite sides of the centerline of main body 302. First and second rear support members extend upwardly from main body 302 and also extend substantially parallel to one another. Front support system 308 also includes a first front tree pick 322a and a second front tree pick 322b. First and second front tree picks 322a,b are coupled to first and second upright support members 314,316, respectively. Rear support system 310 includes a first rear tree pick 324a and a second rear tree pick 324b. First and second rear tree picks 324a,b are coupled to first and second rear support members 318,320, respectively. Front tree picks 322a,b and rear tree picks 324a,b comprise a support housing with an opening (not shown) facing upward from chassis hauler 300. In operation, front tree picks 322a,b and rear tree picks 324a,b are used as supports for the twist locks of a crane, a packer, or other type of lifting machinery. The twist locks enter in the upper opening and lock into position, enabling hauler 300 to be lifted. In this fashion, hauler 300 can be loaded or unloaded onto a rail car.

Turning now to FIGS. 13, 14, and 15, in one embodiment of the present invention, hauler 400 includes a main body 402 which presents a front portion 404 and a rear portion 406. Main body 402 preferably has a length, measured longitudinally, between about 40 feet and about 60 feet, more preferably between about 45 feet and about 55 feet, and most preferably about 53 feet. Main body 402 preferably has a width, measured in a transverse direction, between about 2 feet and about 14 feet, more preferably has a width between about 3 feet and about 8 feet, and most preferably has a width of about 3½ feet. Main body 402 also defines a centerline 408, which bisects main body 402 longitudinally. Chassis hauler 400 also includes a front support system 410 coupled to the front portion 404 of main body 402 and a rear support system 412 coupled to rear portion 402 of main body 402. Preferably, chassis hauler 400 also includes a pickup bracket 414. Pickup bracket 414 consists of at least one lateral support 416 which is coupled to main body 402 and extends transverse to centerline 408 in a range of from about 50 inches to about 144 inches, preferably from about 80 inches to about 110 inches, and most preferably about 96 inches. Pickup bracket 414 also includes at least one rail support 418, which is coupled to lateral support 416 and extends longitudinally to centerline 408 in a range of from about 12 feet to about 18 feet, more preferably from about 13½ feet to about 16½ feet, and most preferably about 16 feet. In another embodiment of the present invention, pickup bracket 414 also includes at least one upright support 420, which is coupled to main body 402. Upright support 420 preferably extends substantially perpendicular to centerline 408 at a range of from about 1 foot to about 4 feet, more preferably from about 2 feet to about 3 feet, and most preferably about 2½ feet. Lateral support 416 and rail support 418 are coupled to upright support 420 and extend in the manner described above. In operation, a crane or other lifting apparatus can clamp onto the pickup bracket in order to load or unload chassis hauler 400 from a railcar.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A hauler comprising:
   a main body having a length measured in a longitudinal direction and a width measured in a transverse direction, said main body defining a longitudinally-extending centerline, said main body presenting longitudinally-spaced front and rear portions;
   a plurality of wheels rotatably coupled to the main body proximate the rear portion; and
   a front support system coupled to the main body proximate the front portion,
   said front support system comprising a first upright support member extending upwardly from the main body and a first lateral support member shiflably coupled to the first upright support member,
   said first lateral support member being shiftable between an extended position where the first lateral support member extends over the centerline and a retracted position where the first lateral support member does not extend over the centerline.

2. The hauler of claim 1,
   said first lateral support member extending transversely at least two feet further in the extended position than in the retracted position.

3. The hauler of claim 1,
   said first lateral support member being hingedly coupled to the first upright support so that the first lateral support member swings substantially horizontally between the extended and retracted positions.

4. The hauler of claim 1,
   said first lateral support member extending at least about four feet from the first upright support member in both the extend and retracted positions.

5. The hauler of claim 1,
   said first lateral support member presenting an upwardly facing support surface spaced above the main body when the first lateral support member is in the extended position, said front support system comprising a second lateral support member shiftably coupled to the first upright support member, said second lateral support member being shiftable between a second extended position where the second lateral support member extends over the centerline and a second retracted position where the second lateral support member does not extend over the centerline, said second lateral support member presenting an upwardly facing support surface spaced at least about one foot above the first lateral support surface when the first and second lateral support members are in the extended positions.

6. The hauler of claim 5, said front support system comprising a third lateral support member coupled to the first upright support member and extending over the centerline, said third lateral support member presenting an upwardly facing third support surface spaced at least about one foot above the main body and at least one foot below the first lateral support surface when the first lateral support member is in the extended position.

7. The hauler of claim 1, said front support system comprising a second upright support member extending upwardly from the main body, said first and second upright support members being disposed on opposite sides of the centerline, said first lateral support member extending between the first and second upright support members in the extended position, said first lateral support member being coupled to the second upright support member in the extended position and decoupled from the second upright support member in the retracted position.

8. The hauler of claim 7, said front support system comprising a third upright support member extending upwardly from the main body, said first and third upright support members being disposed on the same side of the centerline, said first and third upright support members being longitudinally-spaced from one another, said first lateral support member extending between the first and third upright support members in the retracted position, said first lateral support member being coupled to the third upright support member in the retracted position and decoupled from the third upright support member in the extended position.

9. The hauler of claim 8, said first and second upright support members being transversely-spaced from one another by at least about four feet, said first and third upright support members being longitudinally-spaced from one another by at least about four feet.

10. The hauler of claim 7, and;

a rear support structure coupled to the main body proximate the rear portion, said rear support structure comprising first and second rear support members extending upwardly from the main body, said first and second rear support members being disposed on generally opposite sides of the centerline, said first and second upright support members being transversely-spaced from one another by at least about four feet.

11. The hauler of claim 1, said front support system being shiftable between an upright position and a collapsed position, said first upright support member extending at an angle greater than about 60 degrees from horizontal when in the upright position and less than about 30 degrees from horizontal when in the collapsed position.

12. The hauler of claim 1, including a tree pick coupled to the first upright support member.

13. The hauler of claim 1, said main body also including a pickup bracket, said pickup bracket including at least one lateral support coupled to the main body and extending in a transverse direction, said pickup bracket including at least one rail support coupled to the lateral support and extending in a longitudinal direction.

14. A hauler comprising:

a main body having a length measured in a longitudinal direction and a width measured in a transverse direction, said main body defining a longitudinally-extending centerline, said main body presenting longitudinally-spaced front and rear portions;

a plurality of wheels rotatably coupled to the main body proximate the rear portion; and a front support system coupled to the main body proximate the front portion, said front support system comprising first and second upright support members extending upwardly from the main body and disposed on opposite sides of the centerline, said front support system comprising first and second lateral support members shifiably coupled to the first and second upright support members, respectively, said first and second lateral support members being shiftable between extended and retracted positions, each of said first and second lateral support members extending at least six inches further towards the centerline when in the extended position than when in the refracted position.

15. The hauler of claim 14, each of said first and second lateral support members being hingedly coupled to the first and second upright supports, respectively, so that the first and second lateral support members swing substantially horizontally between the extended and retracted positions.

16. The hauler of claim 14, each of said first and second lateral support members presenting a first and second upwardly facing support surface, respectively, spaced above the main body when the first and second lateral support members are in the extended position.

17. The hauler of claim 16, said front support system comprising third and fourth lateral support members shiftably coupled to the first and second upright support members, respectively, said third and fourth lateral support members being shiftable between extended and retracted positions, each of said third and fourth lateral support members extending at least six inches further towards the centerline when in the extended position than when in the retracted position, each of said third and fourth lateral support members being hingedly coupled to the first and second upright supports, respectively, so that the third and fourth lateral support members swing substantially horizontally between the extended and retracted positions, each of said third and fourth lateral support members presenting a third and fourth upwardly facing support surface, respectively, spaced at least one foot above the first and second lateral support members when the first and second lateral support members are in the extended position.

18. The hauler of claim 17, said front support system comprising fifth and sixth lateral support members shiftably coupled to the first and second upright support members, respectively, said fifth and sixth lateral support members being shiftable between extended and retracted positions, each of said fifth and sixth lateral support members extending at least six inches further towards the centerline when in the extended position than when in the retracted position, each of said fifth and sixth lateral support members being hingedly coupled to the first and second upright supports, respectively, so that the fifth and sixth lateral support members swing substantially horizontally between the extended and retracted positions, each of said fifth and sixth lateral support members presenting a fifth and sixth upwardly facing support surface, respectively, spaced at least one foot above the third and fourth lateral support members when the first and second lateral support members are in the extended position.

19. The hauler of claim 14, said first and second upright supports being transversely-spaced from one another by at least about four feet.

20. The hauler of claim 14, and;

a rear support structure coupled to the main body proximate the rear portion, said rear support structure comprising first and second rear support members extending upwardly from the main body.

21. The hauler of claim 14, said front support system being shiftable between an upright position and a collapsed position, said first and second upright support extending at an angle greater than about 60 degrees from horizontal when in the upright position and less than about 30 degrees from horizontal when in the collapsed position.

22. A system for the transportation of chassis, said system comprising:

a chassis hauler having a front support system;

a first chassis comprising a first frame and first set of rear wheels; and a second chassis comprising a second frame and second set of rear wheels, said front support system comprising a first upright support member extending upwardly from the main body, said front support system comprising a first and second lateral support members shiftably coupled to the first upright support member, said first and second lateral support members being shiftable between an extended position and a retracted position, said first and second lateral support members presenting respective first and second upwardly-facing support surfaces, said first chassis being at least partially supported by the first lateral support member in the extended position, said second chassis being at least partially supported by the second lateral support member in the extended position, wherein said first and second chassis are positioned such that the first and second sets of rear wheels face downward.

23. The system of claim 22, further comprising:

a third chassis including at least two rear wheels, said front support system further comprising a third lateral support member coupled to the first upright support member, said third lateral support member presenting a third upwardly faced support surface, said third chassis being at least partially supported by the third lateral support member, said third chassis being positioned such that its rear wheels face downward.

24. The system of claim 23, said third lateral support member being shiftably coupled to the first upright support member such that the third lateral support member is shiftable between an extended position and a retracted position, said third chassis being at least partially supported by the third lateral support member in the extended position.

25. The system of claim 22, said chassis hauler having a rear support system for supporting the first chassis and the second chassis, said rear support system comprising at least one rear upright support member.

26. The system of claim 22, wherein the first and second chassis are positioned such that the second set of rear wheels rest on top of the first set of rear wheels.

27. A method of transporting a chassis comprising:

(a) loading a first chassis onto a chassis hauler such that the first chassis is at least partially supported by a first lateral support member of the hauler;

(b) subsequent to step (a), shifting a second lateral support member of the hauler such that the second lateral support member is in an extended position; and (c) loading a second chassis onto the chassis hauler such that the second chassis is placed over the first chassis to be at least partially supported by the second lateral support member, said first chassis comprising a first frame and first set of rear wheels, said second chassis comprising a second frame and second set of rear wheels, said first and second chassis being loaded such that both the first and second sets of rear wheels face downward.

28. The method of claim 27, further comprising:

(d) shifting a third lateral support member of the hauler into an extended position; and (e) loading a third chassis onto the chassis hauler such that the third chassis is placed over the second chassis and is at least partially supported by the third lateral support member, said third chassis comprising a third frame and a third set of rear wheels, said third chassis being loaded such that the third set of rear wheels face downward.

29. The method of claim 27, wherein the second set of rear wheels rests on top of the first set of rear wheels.

* * * * *